[19] United States Patent
Somers

[10] Patent No.: US 6,905,092 B2
[45] Date of Patent: Jun. 14, 2005

(54) LAMINAR-FLOW AIRFOIL

(75) Inventor: Dan M. Somers, Port Matilda, PA (US)

(73) Assignee: Airfoils, Incorporated, Port Matilda, PA (US)

( * ) Notice: Subject to any disclaimer, the term of this patent is extended or adjusted under 35 U.S.C. 154(b) by 0 days.

(21) Appl. No.: 10/299,660

(22) Filed: Nov. 20, 2002

(65) Prior Publication Data

US 2004/0094659 A1 May 20, 2004

(51) Int. Cl.[7] .............................. B64C 9/14; B64C 9/16
(52) U.S. Cl. ........................ 244/3; 244/35 R; 244/216; 244/211
(58) Field of Search .............................. 244/35 R, 204, 244/209, 210, 211, 216

(56) References Cited

U.S. PATENT DOCUMENTS

| | | |
|---|---|---|
| 1,433,030 A | 10/1922 | Page |
| 1,589,780 A | 6/1926 | Wragg |
| 1,770,575 A | 7/1930 | Ksoll |
| 1,895,140 A | 1/1933 | Stage |
| 2,041,786 A | 5/1936 | Stalker |
| 2,111,274 A | 3/1938 | Bellanca |
| 2,241,521 A | 5/1941 | Richard |
| 2,306,015 A | 12/1942 | Dornier |
| 2,507,611 A | 5/1950 | Pappas et al. |
| 2,576,294 A | 11/1951 | Geraci |
| 3,298,636 A | 1/1967 | Arnholdt |
| 4,146,197 A | 3/1979 | Grotz |
| 4,191,349 A * | 3/1980 | Pravaz |
| 4,498,646 A * | 2/1985 | Proksch et al. ............ 244/35 R |
| 4,575,030 A * | 3/1986 | Gratzer ........................ 244/209 |
| 4,614,320 A | 9/1986 | Rutan |
| 4,813,631 A * | 3/1989 | Gratzer ..................... 244/35 R |
| 4,856,735 A | 8/1989 | Lotz et al. |
| 4,976,349 A | 12/1990 | Adkins |
| 5,294,080 A * | 3/1994 | Ross ........................... 244/216 |
| 5,342,004 A * | 8/1994 | Bobbitt ....................... 244/212 |
| 5,788,190 A * | 8/1998 | Siers ........................... 244/216 |
| 6,293,497 B1 * | 9/2001 | Kelley-Wickemeyer et al. ........................... 244/216 |
| 6,328,265 B1 | 12/2001 | Dizdarevic |
| 6,435,458 B1 | 8/2002 | Bliesner |
| 6,464,171 B2 * | 10/2002 | Ruffin ........................ 244/210 |
| 6,607,164 B2 * | 8/2003 | Somers ..................... 244/35 R |

OTHER PUBLICATIONS

Whitcomb, Richard T. and Clark, Larry R., "An Airfoil Shape for Efficient Flight at Supercritical Mach Numbers." NASA TM X–1109, 1965, pp. 1–57 (Springfield, VA).
Steen, Gregory G., "A Two Element Laminar Flow Airfoil Optimized for Cruise," AIAA Paper 95–0014, Jan. 9–12, 1995, pp. 1–11 (Washington, D.C.).
R.W. Barnwell et al., "Natural Laminar Flow and Laminar Flow Control", 1992, Space Systems Division, NASA Langley Research Center, pp. 1–71.

* cited by examiner

Primary Examiner—Michael J. Carone
Assistant Examiner—Lulit Semunegus
(74) Attorney, Agent, or Firm—Finnegan Henderson Farabow Garrett & Dunner

(57) ABSTRACT

An airfoil having a fore airfoil element, an aft airfoil element, and a slot region in between them. These elements induce laminar flow over substantially all of the fore airfoil element and also provide for laminar flow in at least a portion of the slot region. The method of the invention is one for inducing natural laminar flow over an airfoil. In the method, a fore airfoil element, having a leading and trailing edge, and an aft airfoil element define a slot region. Natural laminar flow is induced over substantially all of the fore airfoil element, by inducing the pressures on both surfaces of the fore airfoil element to decrease to a location proximate the trailing edge of the fore airfoil element using pressures created by the aft airfoil element.

18 Claims, 2 Drawing Sheets

LAMINAR-FLOW AIRFOIL

This invention was made with U.S. Government support under contract NAS1-01076, awarded by the National Aeronautics and Space Administration (NASA). The U.S. Government has certain rights in this invention.

FIELD OF THE INVENTION

Background of the Invention

The present invention relates general airfoils, more particularly, to slotted airfoils. While airfoils can be used in a number of applications other than for the wings or control surfaces of aircraft, most applications for airfoils involve their use in aircraft wings in engine-driven aircraft. In such applications, the efficiency of the aircraft depends in large part on the drag forces impeding the passage of the aircraft through the air. Aircraft drag comprises, many components including: wing profile drag, induced drag, fuselage drag, empennage drag, cooling drag, nacelle drag, trim drag, and interference drag. Generally, the wing profile drag and the induced drag represent the largest contributions to the total aircraft drag. For almost all aircraft, cruise occurs at speeds for which the profile drag dominates. Thus, wing profile drag represents the largest contribution to the total aircraft drag at cruise conditions. For transport aircraft (airliners), the wing profile drag represents about one third of the total aircraft drag at cruise conditions. As the aircraft size decreases from transport through commuter to general-aviation aircraft, including business jets, and finally unmanned aerial vehicles (UAV's), the proportion of the total aircraft drag due to the wing profile drag increases, primarily because the ratio of the wing area to the total aircraft wetted area increases. For a sailplane, which has small fuselage wetted area and no powerplant-installation drag, over half the total aircraft drag in cruise is wing profile drag. Thus, there has been a longstanding search for airfoil shapes that provide acceptable lift but exhibit low profile drag.

Traditionally, three approaches have been taken to reduce wing profile drag. All three approaches involve only the cross-sectional shape (airfoil) of the wing. One approach is to employ a high-lift system (leading-edge slat plus double- or triple-slotted trailing-edge flap) to achieve a higher maximum lift coefficient, which allows the wing area, and therefore the aircraft wetted area, to be reduced. This approach has several disadvantages. Low profile drag is not possible because the slat introduces disturbances that cause the laminar flow to transition to turbulent flow near the leading edge of the wing. The maximum lift coefficient is limited to about 4, which limits the reduction in wing area. High-lift systems are complex, both mechanically and structurally, resulting in higher weight and cost. This approach can provide a maximum wing profile-drag reduction of about 50 percent compared to a conventional, turbulent-flow wing with no high-lift system and has been adopted for all current transport aircraft.

A second approach is to employ a natural-laminar-flow (NLF) airfoil. NLF is also referred to as "passive control." By appropriate airfoil shaping, extensive ($\geq$30-percent chord) laminar flow can be achieved on both the upper and lower wing surfaces. The extent of laminar flow is limited to about 70-percent chord by the pressure-recovery gradient along the aft portion of the airfoil upper surface. The pressure-recovery gradient becomes steeper as the extent of the favorable gradient along the forward portion of the airfoil becomes greater, eventually reaching a limit beyond which trailing-edge separation occurs, resulting in an unacceptably low maximum lift coefficient. The extent of laminar flow is also limited by wing leading-edge sweep, which also constrains the achievement of laminar flow because it introduces cross-flow instabilities into the laminar boundary layer that cause premature transition to turbulent flow. This approach can also provide a wing profile-drag reduction of about 50percent compared to a conventional, turbulent-flow wing and has been adopted for most current general-aviation aircraft (e.g., "business jets" and "sailplanes").

A third approach is to employ a laminar-flow-control (LFC) airfoil. LFC is also referred to as "active control." By incorporating suction through porous or slotted wing skins, 100-percent-chord laminar-flow can be achieved on both the upper and lower wing surfaces. Surface cooling can also increase the extent of laminar flow although it is not currently considered practical. In the case of LFC by suction, the use of the term "slots" in the wing skins refers to the many, very narrow slits in the surface through which air is sucked into the wing, and not a slot between the main and flap elements of a high-lift system. LFC systems are very complex, mechanically, structurally, and operationally, resulting in high weight and cost. This approach can provide a maximum wing profile-drag reduction of about 75 percent compared to a conventional, turbulent-flow wing but has not been adopted for any production aircraft.

There exists, therefore, a need for an improved laminar-flow airfoil that overcomes the disadvantages of prior airfoils.

SUMMARY

According to one aspect of the invention, there is provided an airfoil, having a fore airfoil element, an aft airfoil element, and a slot region in between them. The configuration of each of the fore and aft airfoil elements, along with the configuration of the slot region therein defined, induces laminar flow over substantially all of the fore airfoil element. This configuration also provides for laminar flow in at least a portion of the slot region.

According to another aspect of the invention, the fore and/or aft airfoil elements move, rotate, change shape or translate with respect to one another such that the slot region formed therein varies in shape or volume while still inducing laminar flow over substantially all of the fore airfoil element. Optionally, this variable slot region geometry may adjust in response to operational parameters, for example through a computer-controlled feedback system.

The method embodiment of the invention comprises a method of inducing natural laminar flow over an airfoil. In that method, there is provided a fore airfoil element having a leading and trailing edge. An aft airfoil element is also provided, the fore and aft airfoil elements defining a slot region. Natural laminar flow is induced over substantially all of the fore airfoil element, by inducing the pressures on both surfaces of the fore airfoil element to decrease (i.e., a favorable pressure gradient) to a location proximate the trailing edge of the fore airfoil element using pressures created by the aft airfoil element. Preferably, the method includes the step of inducing natural laminar flow in at least a portion of the slot region, at least partially, using pressures created by the aft airfoil element.

Other features and advantages will be apparent from the accompanying drawings, and from the detailed description, which follows.

BRIEF DESCRIPTION OF THE DRAWINGS

The accompanying drawings, which are incorporated in and constitute a part of this specification, illustrate an embodiment of the invention and, together with the detailed description, serve to explain the principles of the invention. In the Drawings

DESCRIPTION OF THE PREFERRED EMBODIMENTS

Figure 1:
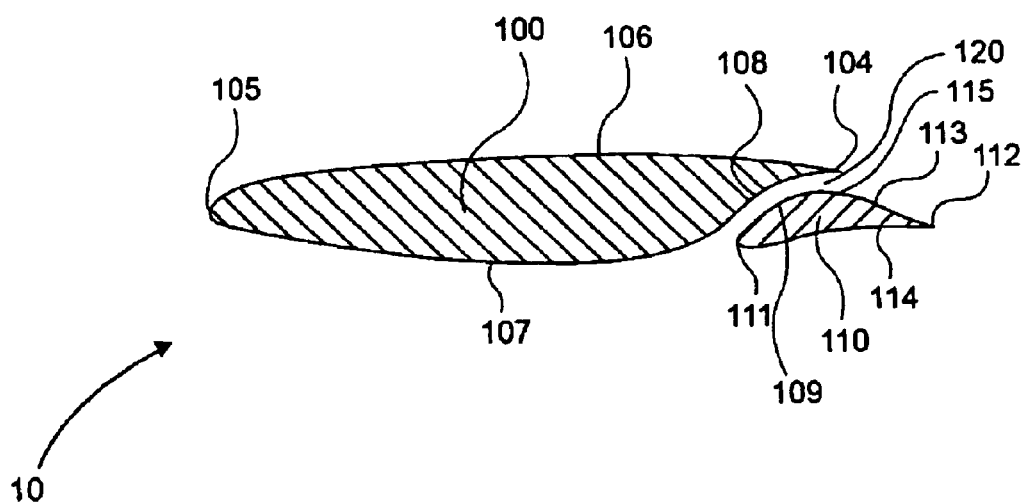
FIG. 1 illustrates a cross-sectional view of an embodiment of a slotted natural-laminar-flow airfoil.

Reference will now be made to an embodiment of the invention, an example of which is illustrated in the accompanying drawings In accordance with the invention, there is provided an airfoil that includes a fore airfoil element. As here embodied, and depicted in FIG. 1, fore airfoil element 100 has an upper surface 106, a lower surface 107, a leading edge 105 and a trailing edge 104. Leading edge 105 provides a first contact between fore airfoil element 100 and the air surrounding the airfoil assembly 10. While the fore element of the airfoil depicted in FIG. 1 has a specific configuration, it is not the only airfoil configuration operable with the present invention. As will be set out below, rather than the invention being specific airfoil shapes, it is the interaction of the fore and aft elements of the airfoil, and their effect on the flow over and through the combined elements that provides the benefits of the invention. With the flow characteristics and pressure distributions described below, one skilled in the development of airfoil shapes can devise a specific shape for the fore airfoil element that will achieve the benefits of the invention.

In accordance with the invention, there is provided an aft airfoil element. As here embodied and depicted in FIG. 1, there is an aft element 110 having an upper surface 113, a lower surface 114, a leading edge 111, and a trailing edge 112. As here embodied, the aft airfoil element is smaller in overall size than fore airfoil element 100. Aft airfoil element 110 provides additional lift to airfoil assembly 10. By not allowing the pressure generated around fore airfoil element 100 to recover to free stream at trailing edge 104 of fore airfoil element 100, aft airfoil element 110 allows the flow to accelerate along both surfaces substantially all the way to trailing edge 104 of fore airfoil element 100, thereby allowing laminar flow to develop over essentially the entire fore airfoil element 100. That is, the wake of fore airfoil element 100 does not significantly impinge on the flow around aft airfoil element 110 and/or through the slot region 120.

Just as was disclosed with respect to the fore airfoil element 100, the aft airfoil element 110 is depicted with a specific configuration. That configuration, however, is not the only aft airfoil configuration operable with the present invention. As was noted above, rather than the invention being specific airfoil shapes, it is the interaction of the elements of the airfoil, and their effect on airflow that provides the benefits of the invention. With the flow characteristics and pressure distributions described below, one skilled in the development of airfoil shapes can devise a specific shape for the aft airfoil element that will achieve the benefits of the invention.

The airfoil assembly 10 can be constructed by conventional manufacturing techniques. This includes, but is not limited to, assembling spars and ribs to create a substructure, and overlaying a skin over this sub-structure to provide an aerodynamic surface. State-of-the-art composite fabrication techniques can be used, and those provide the airfoil(s) of the preferred embodiments with the dimensional precision and light weight that maximize the benefits of the present invention. The materials used in the construction of airfoil assembly 10 are similarly those typically used in the relevant industry (e.g., aerospace, automotive, wind turbines, watercraft). This includes, but is not limited to, metals, plastics, and/or composite materials.

In accordance with the invention, there is provided a slot region defined by surfaces of the fore and aft airfoil elements. As here embodied, the lower aft portion of the fore airfoil element 100 is configured to provide a slot 120 between the fore element 100 and the forward upper portion of the aft element 110. As here embodied, the lower aft portion 108 of the fore airfoil element 100, and the upper forward portion 109 of the aft element 110, form a slot 120 therebetween. As depicted in FIG. 1, it is preferred that the slot be defined by generally parallel surfaces of the fore and aft airfoil elements. As here embodied, the slot 120 shown in cross section in FIG. 1 has parallel sides defined by the lower aft portion 108 of the fore airfoil element 100, and the upper forward portion 109 of the aft element 110. It is further preferred that the trailing edge of fore airfoil element be proximate the maximum thickness of the aft airfoil element. As here embodied, the trailing edge 104 of fore element 100 is located above, and slightly aft, of the maximum thickness 115 of the aft element 110.

In accordance with the invention, the fore airfoil element, the aft airfoil element, and the slot region induce laminar flow over substantially all of the fore airfoil element. Preferably, the laminar flow is natural laminar flow, laminar flow induced solely by the shapes of the airfoil elements. It is the pressure distributions provided by the interaction of the fore and aft airfoil elements, and the slot formed therebetween that provide the advantages of the present invention. Specifically, the airfoil of the present invention provides natural laminar flow over a greater region of a fore airfoil element in a combination of two airfoil elements. Such a combination of airfoil elements provides lower profile-drag coefficients and higher maximum lift coefficients than prior laminar-flow airfoils.

The operational characteristics of the elements of the embodiment of the airfoil of the invention provide guidance with respect to selecting the specific shapes of the various elements and the slot or slots formed between such elements. Such operational characteristics are best described by reference to the pressure distributions on the elements and their combinations at a specific flow condition.

The airfoil of the present invention provides a pressure distribution such that there is a net pressure differential between upper surface 106 and lower surface 107 of fore element 100 and between upper surface 113 and lower surface 114 of aft element 110 of airfoil assembly 10. This pressure differential causes a net force in the positive (generally vertical) direction, i.e., "lift." The greater the net pressure differential, the greater the lift generated by moving such an airfoil through the air.

Variations in the pressure distribution (i.e., the pressure gradient) can disturb laminar flow, which can cause turbulence. To provide lower profile-drag coefficients, the airfoil shape should induce a pressure gradient that sustains laminar flow over as much of the airfoil cross-sectional length (i.e., chord length) as possible.

As here embodied, trailing edge 104 of fore airfoil element 100 horizontally overhangs aft airfoil element approximately one-half of the aft airfoil element's 110 chord length. In addition, upper surface 113 of aft airfoil element 110 exhibits a generally convex exterior, and has a shape disposed to provide aerodynamic lift. The aft section of lower surface 107 of fore airfoil element 100 has a concave exterior that corresponds to the convex exterior of aft airfoil element 110. This concave exterior is displaced away from the convex exterior to enable the laminar flow to remain undisturbed, resulting in laminar flow along substantially all of fore airfoil element 100 and through at least a portion of slot region 120.

The shape and configuration of slot region 120 can be determined by the shape and position of lower surface 107 of fore airfoil element 100 and the shape and position of upper surface 113 of aft airfoil element 110. The configuration and shape of fore airfoil element 100, aft airfoil element 110, and slot region 120 promote laminar flow through slot region 120, unlike prior airfoils.

The extent of laminar flow through slot region 120 contributes to laminar flow over substantially all of fore airfoil element 100. In another embodiment, slot region 120 geometry can be varied with the goal of maintaining laminar flow over substantially all of fore airfoil element 100 and through at least a portion of slot 120. The geometry may vary by adjusting the space between fore airfoil element 100 and aft airfoil element 110, or by adjusting the shape, rotation and/or translation of fore airfoil element 100 or aft airfoil element 110 (or both), or by a combination of these variations. In another embodiment, this variation in geometry of slot region 120 can occur during operation in response to certain design and factual considerations, e.g., through the use of a computer-controlled feedback system.

Figure 2:
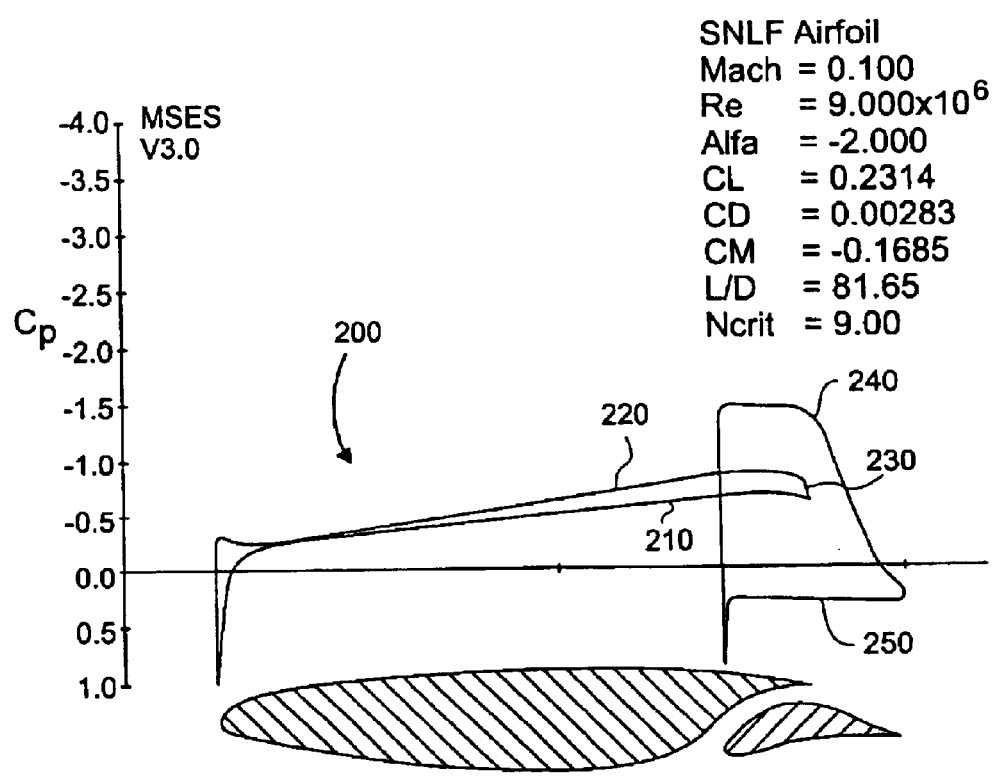
FIG. 2 illustrates the pressure distribution created by the embodiment of FIG. 1 under certain specified conditions.

FIG. 2 shows a pressure distribution 200 for the airfoil of FIG. 1. The pressure distribution 200 is plotted on the vertical axis in terms of the pressure coefficient $C_P$. The horizontal axis corresponds to distance along the chord of the airfoil. A pressure coefficient ($C_P$) of zero corresponds to the static pressure of the free-stream flow far from the airfoil. Negative $C_P$ (above the horizontal axis) represents lower pressure (and higher velocity) than the free stream. Positive $C_P$ (below the horizontal axis) represents higher pressure (and lower velocity) than the free stream.

FIG. 2 depicts the pressure distribution on this embodiment along the chord of each airfoil element. The pressure distributions for both fore airfoil element 100 and aft airfoil element 110 are plotted on the same figure to show the pressure distribution for each of the elements of the airfoil assembly 10. The lower curve 210 of the pressure distribution represents the pressure on upper surface 106 of fore airfoil element 100. An upper curve 220 represents the pressure on lower surface 107 of fore airfoil element 100. The vertical distance between the two curves represents the pressure difference between upper surface 106 and lower surface 107 of fore airfoil element 100. The upper curve 240 of the pressure distribution represents the pressure on upper surface 113 of aft airfoil element 110. A lower curve 250 represents the pressure on lower surface 114 of aft airfoil element 110. The vertical distance between the two curves represents the pressured difference between upper surface 113 and lower surface 114 of aft airfoil element 110.

The spike in the positive direction of pressure at leading edge 105 of fore element 100 of airfoil assembly 10 is called the "stagnation point", the point at which the oncoming flow first attaches to airfoil assembly 10. Another positive spike in pressure exists just forward of the trailing edge 104 of fore airfoil element 100, corresponding to the stagnation point of leading edge 111 of aft airfoil element 110.

Upper curve 220 and lower curve 210 join together at trailing edge 104 of fore airfoil element 100 to a single value of $C_P$ that is lower than free-stream static pressure. In a typical slotted wing of the prior art, a pressure increase begins well before the trailing edge of the fore airfoil element, particularly on the lower surface.

In the embodiment shown in FIGS. 1 and 2, almost no pressure increase occurs forward of trailing edge 104 of fore airfoil element 100. This allows laminar flow to occur over substantially all of fore airfoil element 100. In addition, laminar flow can occur in at least a portion of slot 120.

The airfoil of the present invention provides a pressure distribution such that there exists a net pressure differential between upper surface 106 and lower surface 107 of fore element 100 and between upper surface 113 and lower surface 114 of aft element 110 of airfoil assembly 10. This pressure differential causes a net force in the positive vertical direction, which, in conventional aircraft applications, provides lift for an airplane. The terms "upper" and "lower" do not, however, indicate the only possible orientation of the airfoil of the present invention. The airfoil of the present invention can also be used in an inverted configuration to that shown in the figures to provide a downward force, which, for example, in automotive applications improves the traction for a vehicle including such an airfoil. The airfoil of the present invention can be used vertically as a "sail" on a watercraft, where the airfoil of the present invention would produce a horizontal force to propel the watercraft in the desired horizontal direction.

What is claimed is:

1. An airfoil comprising:
    a fore airfoil element; and
    an aft airfoil element having a chord less than that of the fore airfoil element, the fore and aft airfoil elements defining a slot region,
    said fore airfoil element, said aft airfoil element, and said slot region passively inducing laminar flow over at least about 75% of the fore airfoil element when the airfoil is operating at cruise conditions.

2. The airfoil of claim 1, the slot region being defined by a leading, upper portion of the aft airfoil element and a trailing, lower portion of the forward airfoil element.

3. The airfoil of claim 1, the slot region being defined by surfaces on the forward airfoil element and said aft airfoil element, said surfaces being substantially parallel.

4. The airfoil of claim 1, wherein the configuration of said slot region is fixed.

5. The airfoil of claim 1, wherein the configuration of said slot region is variable.

6. The airfoil of claim 5, wherein the configuration of the slot region is adjusted in response to flight parameters.

7. An airfoil comprising:
    a fore airfoil element; and
    an aft airfoil element having a chord less than that of the fore airfoil element, the fore and aft airfoil elements defining a slot region,
    said fore airfoil element, said aft airfoil element, and said slot region passively inducing laminar flow over the fore airfoil element, the slot region, and a substantial portion of the aft airfoil element when the airfoil is operating at cruise conditions.

8. The airfoil of claim 7, the slot region being defined by a leading, upper portion of the aft airfoil element and a trailing, lower portion of the forward airfoil element.

9. The airfoil of claim 7, the slot region being defined by surfaces on the forward airfoil element and said aft airfoil element, said surfaces being substantially parallel.

10. The airfoil of claim 7, wherein the configuration of said slot region is fixed.

11. The airfoil of claim 7, wherein the configuration of said slot region is variable.

12. The airfoil of claim 11, wherein the configuration of the slot region is adjusted in response to flight parameters.

13. A multielement airfoil disposed to operate in a regime to generate lift, said multielement airfoil comprising:
a fore airfoil; and
an aft airfoil element having a chord less than that of the fore airfoil element, the fore and aft airfoil elements defining a slot region, the fore airfoil element, the aft airfoil element, and the slot region being adapted to achieve natural laminar flow over substantially all of the fore airfoil element and a portion of the slot region when the multielement airfoil is operating at cruise conditions.

14. The airfoil of claim 13, the slot region being defined by a leading, upper portion of the aft airfoil element and a trailing, lower portion of the forward airfoil element.

15. The airfoil of claim 13, the slot region being defined by surfaces on the forward airfoil element and said aft airfoil element, said surfaces being substantially parallel.

16. The airfoil of claim 13, wherein the configuration of said slot region is fixed.

17. The airfoil of claim 13, wherein the configuration of said slot region is variable.

18. The airfoil of claim 17, wherein the configuration of the slot region is adjusted in response to flight parameters.

* * * * *